C. LINGUIST.
WAGON RACK.
APPLICATION FILED AUG. 28, 1908.

951,284. Patented Mar. 8, 1910.

Witnesses. Inventor:

UNITED STATES PATENT OFFICE.

CHARLES LINGUIST, OF WATERFORD, ONTARIO, CANADA, ASSIGNOR OF ONE-HALF TO ROBERT CLAYTON KEMP, OF WATERFORD, CANADA.

WAGON-RACK.

951,284.  Specification of Letters Patent.  Patented Mar. 8, 1910.

Application filed August 28, 1908. Serial No. 450,665.

*To all whom it may concern:*

Be it known that I, CHARLES LINGUIST, of the village of Waterford, in the county of Norfolk and Province of Ontario, Canada, have invented certain new and useful Improvements in Wagon-Racks; and I hereby declare that the following is a full, clear, and exact description of the same.

This invention relates to a wagon rack which can be used as a stock rack or, with a slight alteration, as a hay rack, and it relates particularly to certain novel features in the construction of the wagon box, in the attachment of the wagon rack to the wagon box, and to the means for holding the rack sides and rack ends in their fixed position when the parts are employed either as a hay or stock rack.

For an understanding of the invention reference is to be had to the following description and to the accompanying drawings in which:—

Figure 1:
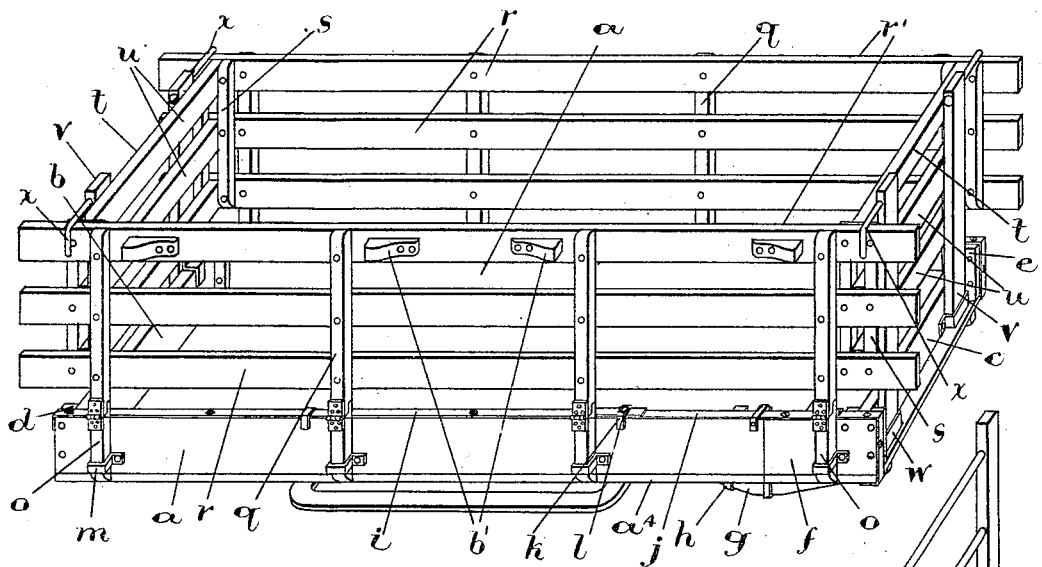
Figure 2:
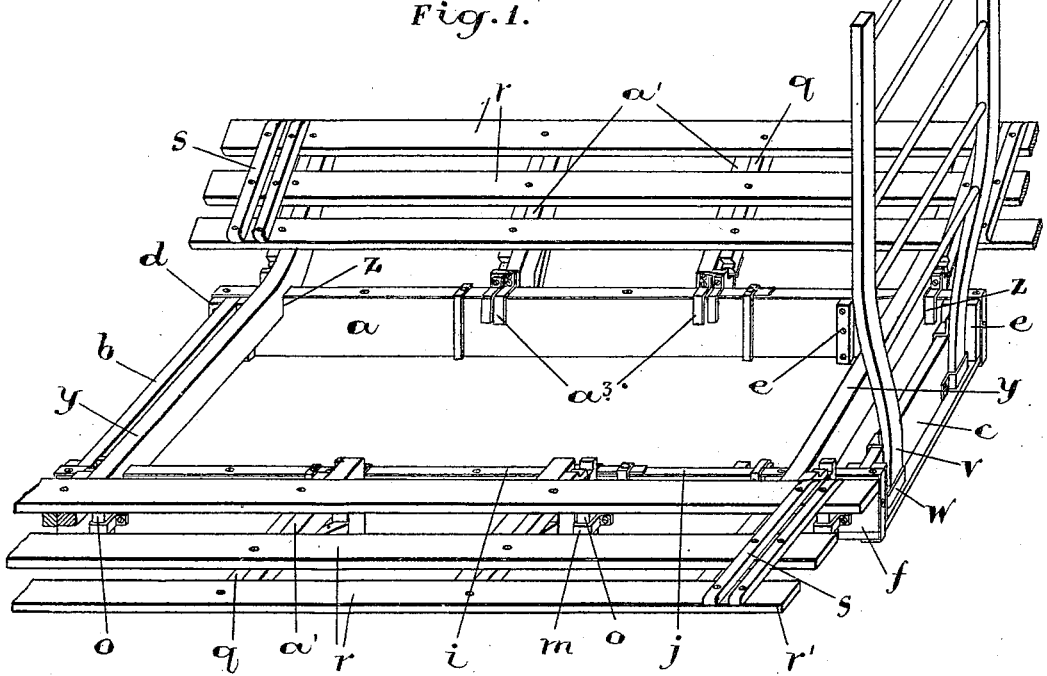

Figure 1, is a perspective view of the wagon rack employed as a stock rack. Fig. 2, is a perspective view of the wagon rack employed as a hay rack.

Like characters of reference refer to like parts throughout the specification and drawings.

The wagon box consists of two side boards $a$, a head board $b$ and a tail board $c$, the head and tail boards being removably held in place by guide blocks, $d$ and $e$ respectively, secured to the inner surfaces of the side boards $a$.

The wagon box sides $a$ are normally of ordinary length but when they are to be used in conjunction with the rack sides and ends, extension pieces $f$ are connected to them so that they will be of the proper length for rack purposes. The extension pieces $f$ are supported upon braces $g$ bolted or fastened by brackets $h$ to the under surface of the wagon bottom $a^4$, or to the under surfaces of the wagon sides $a$. The top surfaces of the wagon box sides $a$ are provided with metal straps $i$, and the rear and top surfaces of the extension pieces $f$ are provided with metal straps $j$ which project beyond the front end of the extension pieces and are overlapped by the rear ends of the straps $i$. Embracing the front ends of the straps $j$ and the rear ends of the straps $i$ and the inner and under surfaces of the wagon box sides $a$ are hook shaped straps $k$, and passing through the straps $k$, $j$ and $i$ and wagon box sides $a$ are bolts $l$ which fasten them together and enable the straps $j$ to connect the extension pieces to the wagon box sides to assist the braces $g$ in supporting the extension pieces in their connected position.

Secured to the outer surfaces of the wagon box sides $a$ and extension pieces $f$ are stake holders $m$, and removably contained in the stake holders $m$ are the lower sections $o$ of the wagon stakes. The wagon stake sections $o$ extend approximately to the top of the wagon box sides $a$, and connected to the top of the wagon stake sections $o$ are the upper sections $q$, to the inner surfaces of which are fastened the rails $r$ which extend beyond the ends of the wagon box when the extension pieces $f$ are connected. The inner surfaces of the rack sides $r'$, formed by the rails $r$ and upper stake sections $q$, are provided with guide pieces $s$, to hold the rack ends $t$ consisting of cross rails $u$ and stakes $v$. The lower ends of the stakes $v$ are contained in stake holders $w$ connected to the head and tail boards so that the rack ends can be removably held in place between the rack sides. For stock racks the rack ends $t$ are substantially the same height as the rack sides but for hay racks, the rack ends are of a height suitable to prevent the load sliding lengthwise of the rack.

The structure shown in Fig. 1, is used for stock rack purposes, with the rack sides and ends in a vertical position the rack sides being clamped against the rack ends by substantially U-shaped bolts $x$ extending across the rack and having their ends bent to engage the outer surfaces of the top rails of the rack sides. For hay rack purposes the rack sides are lowered into the position shown in Fig. 2, and are supported in that position by two cross braces $y$ having projecting ends to engage the outer surfaces of the rack sides when lowered into that position. The cross braces are approximately located at the ends of the rack and are formed with notches $z$ to embrace the wagon box sides $a$.

Connected to the outer surfaces of the wagon box sides $a$ intermediate the cross braces $y$, are L-shaped braces $a'$ the vertical arms of which are provided with brace holders $a^3$ which engage the top and inner surfaces of the wagon box sides in juxtaposition to the center stakes as shown in Fig. 2. By providing the hay rack with the L-shaped braces $a'$ the bottom of the wagon box is unobstructed between the cross braces $y$ so that the loading and unloading of the wagon may be unimpeded by any obstruction to the forks.

The top rails of the rack sides are provided with stops $b'$, and when the rack sides are lowered into the position shown in Fig. 2, the stops $b'$ engage the projecting ends of the cross braces $y$ and the upwardly inclined arms of the L-shaped braces $a'$ and clamp these parts against the upper sections $q$ of the wagon stakes to prevent the displacement of the cross braces and L-shaped braces from their fixed position on the wagon box sides.

The construction above described permits of the rack being used either for carrying stock or hay or straw, and also permits of the racks being detached from the wagon box so that the latter can be used for ordinary purposes. By providing the wagon box sides with extension pieces $f$ the wagon box can be lengthened to receive the rack without having to lengthen the wagon reach or remove the ordinary wagon box and replace it with one suitable for rack purposes.

Having thus fully described my invention what I claim as new and desire to secure by Letters Patent is:—

The hereinbefore described device comprising two wagon box sides, metal straps on the top sides thereof, extension pieces at the ends of the wagon box sides having metal straps along their top sides and extending beneath the metal straps of the wagon box sides, braces beneath the adjoining ends of the wagon box sides and extension pieces, clips engaging with the metal straps of the wagon box sides, and bolts passing through the clips and the straps on the wagon box sides and extension pieces.

Waterford, July 30th 1908.

CHARLES LINGUIST.

Signed in the presence of—
 JOHN PEW,
 A. M. TOBIN.